United States Patent
Sundaram et al.

(10) Patent No.: US 7,376,736 B2
(45) Date of Patent: *May 20, 2008

(54) METHOD AND SYSTEM FOR PROVIDING ON-DEMAND CONTENT DELIVERY FOR AN ORIGIN SERVER

(75) Inventors: Ravi Sundaram, Cambridge, MA (US); Hariharan S. Rahul, Cambridge, MA (US)

(73) Assignee: Akamai Technologies, Inc., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/598,400

(22) Filed: Nov. 13, 2006

(65) Prior Publication Data

US 2007/0061440 A1    Mar. 15, 2007

Related U.S. Application Data

(63) Continuation of application No. 10/272,368, filed on Oct. 15, 2002, now Pat. No. 7,136,922.

(51) Int. Cl.
*G06F 15/173* (2006.01)

(52) U.S. Cl. .................. 709/224; 709/217; 709/223; 709/235; 709/245

(58) Field of Classification Search ........ 709/202–203, 709/217–219, 223–226, 229, 235, 238–239, 709/245

See application file for complete search history.

(56) References Cited

U.S. PATENT DOCUMENTS

| | | | |
|---|---|---|---|
| 5,991,809 A | 11/1999 | Kriegsman | |
| 6,003,030 A | 12/1999 | Kenner et al. | |
| 6,108,703 A | 8/2000 | Leighton et al. | |
| 6,167,427 A | 12/2000 | Rabinovich et al. | |
| 6,185,598 B1 | 2/2001 | Farber et al. | |
| 6,405,252 B1 | 6/2002 | Gupta et al. | |
| 6,694,358 B1 | 2/2004 | Swildens et al. | |
| 6,754,699 B2 | 6/2004 | Swildens et al. | |
| 7,096,263 B2 | 8/2006 | Leighton et al. | |
| 7,111,061 B2 * | 9/2006 | Leighton et al. | 709/224 |
| 7,136,922 B2 * | 11/2006 | Sundaram et al. | 709/224 |
| 7,194,522 B1 * | 3/2007 | Swildens et al. | 709/217 |
| 7,200,681 B1 | 4/2007 | Lewin et al. | |
| 7,240,100 B1 | 7/2007 | Wein et al. | |
| 7,251,688 B2 | 7/2007 | Leighton et al. | |
| 7,274,658 B2 | 9/2007 | Bornstein et al. | |
| 7,293,093 B2 | 11/2007 | Leighton et al. | |

(Continued)

*Primary Examiner*—Bharat Barot
(74) *Attorney, Agent, or Firm*—David H. Judson

(57) ABSTRACT

An infrastructure "insurance" mechanism enables a Web site to fail over to a content delivery network (CDN) upon a given occurrence at the site. Upon such occurrence, at least some portion of the site's content is served preferentially from the CDN so that end users that desire the content can still get it, even if the content is not then available from the origin site. In operation, content requests are serviced from the site in the usual manner, e.g., by resolving DNS queries to the site's IP address, until detection of the given occurrence. Thereafter, DNS queries are managed by a CDN dynamic DNS-based request routing mechanism so that such queries are resolved to optimal CDN edge servers. After the event that caused the occurrence has passed, control of the site's DNS may be returned from the CDN back to the origin server's DNS mechanism.

4 Claims, 3 Drawing Sheets

U.S. PATENT DOCUMENTS

| | | |
|---|---|---|
| 7,299,291 B1 | 11/2007 | Shaw |
| 2002/0143798 A1 | 10/2002 | Lisiecki et al. |
| 2002/0143888 A1 | 10/2002 | Lisiecki et al. |
| 2002/0147774 A1 | 10/2002 | Lisiecki et al. |
| 2007/0055764 A1* | 3/2007 | Dilley et al. ............... 709/223 |
| 2007/0174442 A1* | 7/2007 | Sherman et al. ............ 709/223 |

* cited by examiner

METHOD AND SYSTEM FOR PROVIDING ON-DEMAND CONTENT DELIVERY FOR AN ORIGIN SERVER

This application is a continuation of Ser. No. 10/272,368, filed Oct. 15, 2002 now U.S Pat. No. 7,136,922.

BACKGROUND OF THE INVENTION

1. Technical Field

The present invention relates generally to techniques for enabling a Web site origin server to obtain content delivery services from a third party service provider on an as-needed basis.

2. Description of the Related Art

Today's Web sites are a double-edged sword. They present enterprises with the opportunity for both resounding success and costly, dramatic failure. The possibility for either scenario to occur is chiefly due to the Internet's open design. Indeed, the ability to reach a global community of customers and partners via the Web comes with many risks. The open design means that enterprises must expose themselves by opening a public entry-point to get the global reach they need. Couple that with the inherent weaknesses of centralized infrastructure and there is a recipe for failure. Indeed, a growing number of threats can bring a site down daily. These threats include hacker attacks, viruses, Internet worms, content tampering and Denial of Service (DoS) attacks. Moreover, the site's popularity itself can generate "flash crowds" that overload the capabilities of the site's origin server(s). Any one of these events can produce unpredictable site disruptions that impede revenue operations, dilute brand investments, hamper productivity and reduce goodwill and reputation.

A content provider can ameliorate these problems by outsourcing its content delivery requirements to a content delivery network (a "CDN"). A content delivery network is a collection of content servers and associated control mechanisms that offload work from Web site origin servers by delivering content on their behalf to end users. A well-managed CDN achieves this goal by serving some or all of the contents of a site's Web pages, thereby reducing the customer's infrastructure costs while enhancing an end user's browsing experience from the site. In operation, the CDN uses a request routing mechanism to locate a CDN content server close to the client to serve each request directed to the CDN, where the notion of "close" is based, in part, on evaluating results of network traffic tests.

While content delivery networks provide significant advantages, some content providers prefer to maintain primary control over their Web site infrastructure or may not wish to pay for the cost of fully-provisioned CDN services. As a result, the site remains exposed to the myriad of potential security and flash crowds that may bring the site down at any time.

It would be highly desirable to provide a content provider the ability to receive "on demand" use of a CDN to provide an additional layer of protection to ensure business continuity of an enterprise Web site. The present invention addresses this need.

BRIEF SUMMARY OF THE INVENTION

It is a primary object of the present invention to provide an infrastructure "insurance" mechanism that enables an origin server to selectively use or fail over to a content delivery network (CDN) upon a given occurrence at the site. Upon such occurrence, at least some portion of the site's content is served from the CDN so that end users that desire the content can still get it, even if the content is not then available from the origin site.

It is another primary object of the invention to provide origin server "insurance" to render server content accessible even if access to the origin server is inhibited in some way.

It is another more specific object of the present invention to provide a mechanism that enables a Web site origin server to use a content delivery network for insurance purposes on an as-needed basis. Preferably, this operation occurs in a seamless and automatic manner, and it is maintained for a given time period, e.g., for as long as the need continues.

According to an illustrative embodiment, the technical advantages of the present invention are achieved by monitoring an origin server for a given occurrence and, upon that occurrence, providing failover of the site to a CDN. Preferably, this is accomplished by re-directing DNS queries (to the origin server) to the CDN service provider's request routing mechanism. In this fashion, DNS queries for content are resolved by the CDN DNS mechanism as opposed to the site's usual DNS. The CDN DNS mechanism then maps each DNS request to an optimal server in the CDN in a known manner to enable the requesting end user to obtain the desired content, even if the origin server is unavailable. As a consequence of this site insurance, given content on the origin server is always available.

The site insurance may be triggered upon a given occurrence—the scope of which is quite variable. Representative occurrences include, without limitation, a flash crowd at the site, a site failure, excess traffic to the site originating from certain geographies or networks, excess demand for certain content on the site such as high resolution streaming content, excess latency or slowdown at the site as perceived by network downloading agents deployed throughout the CDN or elsewhere, or a site attack such as a Denial of Service (DoS) attack at or adjacent the site. Generally, the present invention selectively moves traffic from the origin to the CDN when there is excessive load on the origin or the origin is unreachable. These examples, however, are merely illustrative.

The site insurance functionality may operate in a standalone manner or be integrated with other CDN services, such as global traffic management.

The foregoing has outlined some of the more pertinent features of the present invention. These features should be construed to be merely illustrative. Many other beneficial results can be attained by applying the disclosed invention in a different manner or by modifying the invention as will be described.

DETAILED DESCRIPTION OF THE PREFERRED EMBODIMENT

By way of background, it is known in the prior art to deliver digital content (e.g., HTTP content, streaming media and applications) using an Internet content delivery network (CDN). A CDN is a network of geographically-distributed content delivery nodes that are arranged for efficient delivery of content on behalf of third party content providers. Typically, a CDN is implemented as a combination of a content delivery infrastructure, a request-routing mechanism, and a distribution infrastructure. The content delivery infrastructure usually comprises a set of "surrogate" origin servers that are located at strategic locations (e.g., Internet network access points, Internet Points of Presence, and the like) for delivering content to requesting end users. The request-routing mechanism allocates servers in the content delivery infrastructure to requesting clients in a way that, for web content delivery, minimizes a given client's response time and, for streaming media delivery, provides for the highest quality. The distribution infrastructure consists of on-demand or push-based mechanisms that move content from the origin server to the surrogates. An effective CDN serves frequently-accessed content from a surrogate that is optimal for a given requesting client. In a typical CDN, a single service provider operates the request-routers, the surrogates, and the content distributors. In addition, that service provider establishes business relationships with content publishers and acts on behalf of their origin server sites to provide a distributed delivery system.

Figure 1:
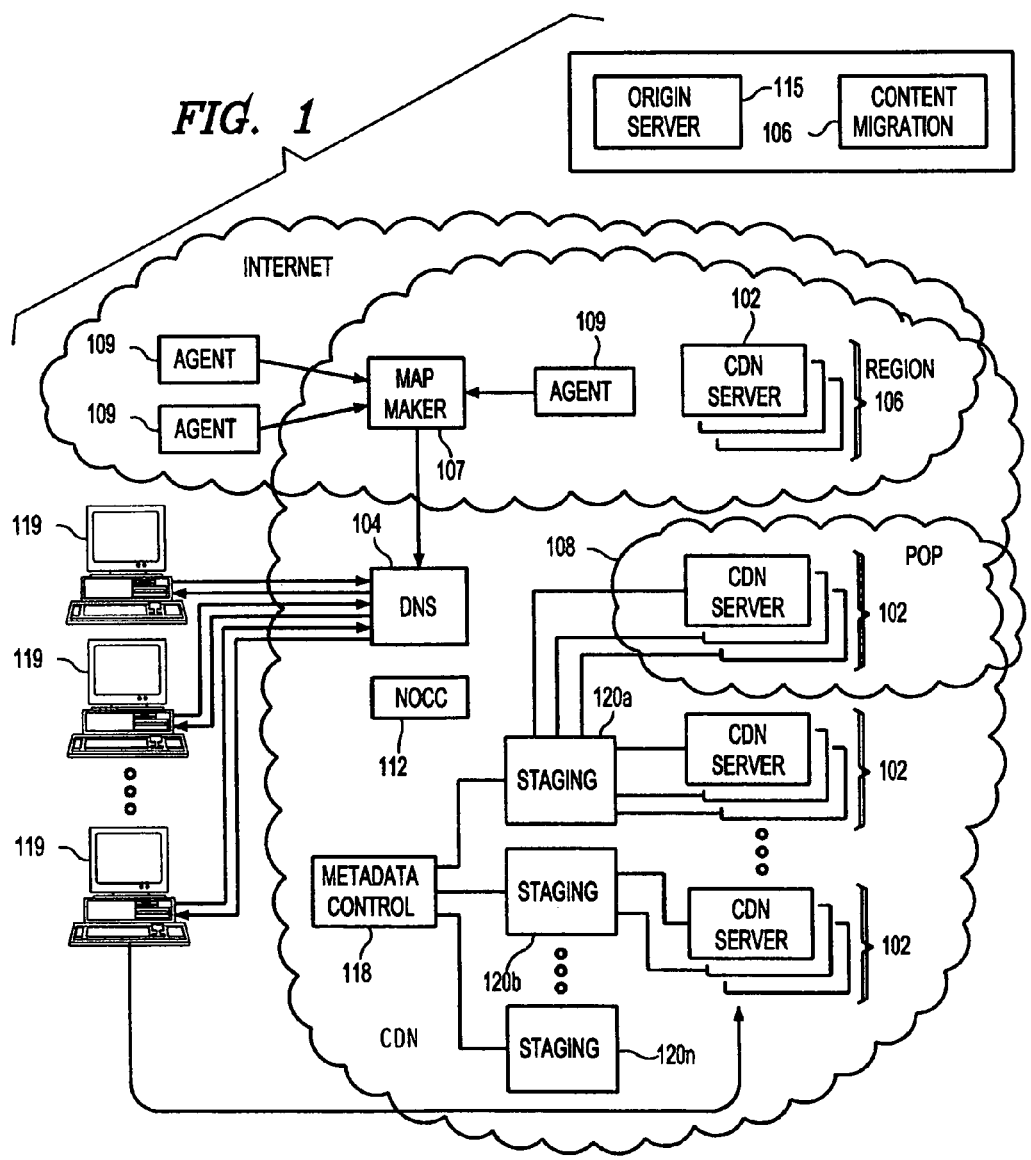
FIG. 1 is a block diagram of a known content delivery network in which the present invention may be implemented.

As seen in FIG. 1, an Internet content delivery infrastructure usually comprises a set of "surrogate" origin servers 102 that are located at strategic locations (e.g., Internet network access points, and the like) for delivering copies of content to requesting end users 119. A surrogate origin server is defined, for example, in IETF Internet Draft titled "Requirements for Surrogates in the HTTP" dated Aug. 9, 2000, which is incorporated herein by reference. The request-routing mechanism 104 allocates servers 102 in the content delivery infrastructure to requesting clients. The distribution infrastructure consists of on-demand or push-based mechanisms that move content from the origin server to the surrogates. A CDN service provider (CDNSP) may organize sets of surrogate origin servers as a group or so-called "region." In this type of arrangement, a CDN region 106 typically comprises a set of one or more content servers that share a common back-end network, e.g., a LAN, and that are located at or near an Internet access point. Thus, for example, a typical CDN region may be co-located within an Internet Service Provider (ISP) Point of Presence (PoP) 108. A representative CDN content server is a Pentium-based caching appliance running an operating system (e.g., Linux, Windows NT, Windows 2000) and having suitable RAM and disk storage for CDN applications and content delivery network content (e.g., HTTP content, streaming media and applications). Such content servers are sometimes referred to as "edge" servers as they are located at or near the so-called outer reach or "edge" of the Internet. The CDN typically also includes network agents 109 that monitor the network as well as the server loads. These network agents are typically co-located at third party data centers or other locations. Mapmaker software 107 receives data generated from the network agents and periodically creates maps that dynamically associate IP addresses (e.g., the IP addresses of client-side local name servers) with the CDN regions.

Content may be identified for delivery from the CDN using a content migrator or rewrite tool 106 operated, for example, at a participating content provider server. Tool 106 rewrites embedded object URLs to point to the CDNSP domain. A request for such content is resolved through a CDNSP-managed DNS to identify a "best" region, and then to identify an edge server within the region that is not overloaded and that is likely to host the requested content. Instead of using content provider-side migration (e.g., using the tool 106), a participating content provider may simply direct the CDNSP to serve an entire domain (or subdomain) by a DNS directive (e.g., a CNAME). In either case, the CDNSP may provide object-specific metadata to the CDN content servers to determine how the CDN content servers will handle a request for an object being served by the CDN. Metadata, as used herein, refers to a set of control options and parameters for the object (e.g., coherence information, origin server identity information, load balancing information, customer code, other control codes, etc.), and such information may be provided to the CDN content servers via a configuration file, in HTTP headers, or in other ways. The Uniform Resource Locator (URL) of an object that is served from the CDN in this manner does not need to be modified by the content provider. When a request for the object is made, for example, by having an end user navigate to a site and select the URL, a customer's DNS system directs the name query (for whatever domain is in the URL) to the CDNSP DNS request routing mechanism. A representative CDN DNS request routing mechanism is described, for example, in U.S. Pat. No. 6,108,703, the disclosure of which is incorporated herein by reference. Once an edge server is identified, the browser passes the object request to the server, which applies the metadata supplied from a configuration file or HTTP response headers to determine how the object will be handled.

As also seen in FIG. 1, the CDNSP may operate a metadata transmission system 116 comprising a set of one or more servers to enable metadata to be provided to the CDNSP content servers. The system 116 may comprise at least one control server 118, and one or more staging servers 120a-n, each of which is typically an HTTP server (e.g., Apache). Metadata is provided to the control server 118 by the CDNSP or the content provider (e.g., using a secure extranet application) and periodically delivered to the staging servers 120a-n. The staging servers deliver the metadata to the CDN content servers as necessary.

The above described content delivery network is merely illustrative. The present invention may leverage any content delivery infrastructure in which a service provider operates any type of DNS-based request routing mechanism.

According to the present invention, a content provider's origin server(s) provide the Web site's content in the usual manner that would occur in the absence of a content delivery network (CDN). The origin server(s) may be located at a content provider location or a third party hosting site. Thus, conventionally, an end user running a client machine would launch his or her Web browser to a URL identifying the content provider Web site. Through conventional DNS, the end user's browser would be connected to the origin server to fetch the content. That well-known operation is augmented according to the present invention to provide so-called "site insurance," which is a technique to provide "on-demand" use of the CDN in given circumstances. The CDN service provider preferably makes the site insurance functionality available to one or more content provider customers as a managed service, which is available on an as-needed basis. Thus, according to the invention, Web site traffic is handled by the origin server(s) in the usual manner (i.e., without the CDN) and is triggered upon a given occurrence at the origin server. Representative occurrences include, without limitation, a flash crowd at the site, a site failure, excess traffic to the site originating from certain geographies or networks, excess demand for certain content on the site such as high resolution streaming content, excess latency or slowdown at the site as perceived by network downloading agents deployed throughout the CDN or elsewhere, a Denial of Service (DoS) attack at or adjacent the site, a DoS attack that indirectly impacts the site, or the like. Of course, the above examples are merely illustrative.

Figure 2:
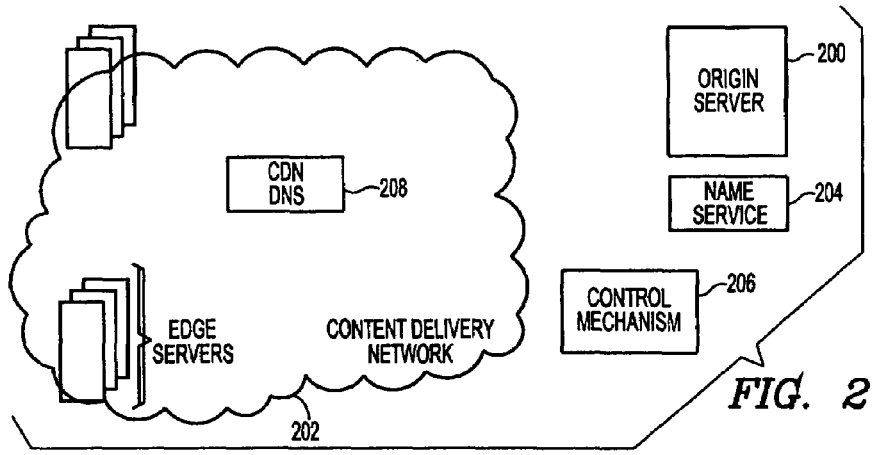
FIG. 2 is a simplified block diagram illustrating how site insurance functionality is provided according to the present invention.

FIG. 2 is a simplified block diagram of how site insurance is provided to a particular origin server 200 by the service provider operating a CDN 202. Origin server 200 has a name service 204 (e.g., running DNS software such as BIND) associated therewith. According to the invention, the name service 204 is modified to include a control mechanism 206 that monitors the server for one or more given occurrences that trigger the site insurance. Alternatively, control mechanism 206 operates in association with the CDN name service. In an illustrative embodiment, the control mechanism is implemented in software executable on a processor and implements a dynamic modification of a local DNS record (e.g., a DNS A record) upon determining that the given occurrence has taken place. Thus, the local DNS record may be modified so that a given content provider domain is directed to a CDN-specific domain, i.e., a domain that cues the CDN's request routing mechanism 208 to handle the given request. Illustratively, assume that the normal content provider domain is www.cp.com and that this is the domain that is used by a given end user browser to fetch content from the origin server. According to the invention, when the control mechanism 206 identifies the given condition at the site that triggers the site insurance server, that mechanism rewrites the DNS record in the name service 204 so that www.cp.com points to a CDN request routing mechanism. Thus, for example, if the CDN domain is g.cdnsp.net, the domain www.cp.com is pointed to g.cdnsp.net. A convenient way to do this is to insert a DNS CNAME into the A record for www.cp.com. Any other convenient aliasing technique, such as domain delegation, can be used. As a result of this modification, requests for content associated with the www.cp.com domain are selectively handled by the CDN.

Figure 3:
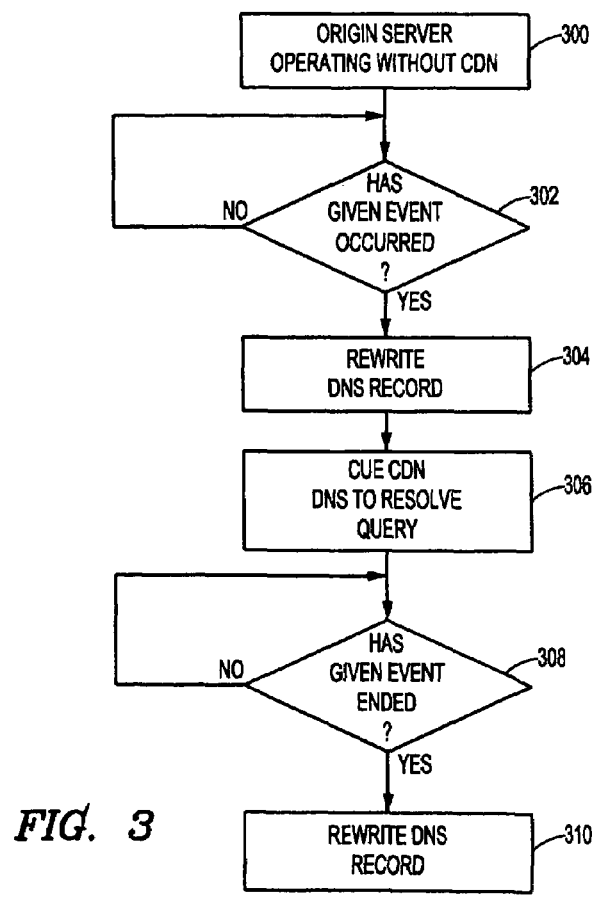
FIG. 3 is a flowchart illustrating how the site insurance is triggered upon determination of a given event at the origin server.

FIG. 3 is a flowchart of the process for a particular event that triggers the site insurance. Step 300 assumes the default operation wherein the origin server is operating without assistance from the CDN. At step 302, a test is made to determine whether a given event triggering the site "insurance policy" has occurred. If not, the routine cycles. As noted above, there may be many diverse types of events that could trigger the insurance. When the given event occurs, as indicated by a positive outcome of the test at step 302, the routine continues at step 304 wherein the control mechanism rewrites the local DNS record as described above. This redirects DNS queries, which were originally intended for the content provider domain, to the CDN domain. At step 306, this rewrite cues the CDNSP's DNS request routing mechanism to resolve the query. As a consequence, the query (and thus the content request) is managed by the CDN, thereby relieving the origin server of having to handle the request. At step 308, a test is made to determine whether the given event that has triggered the insurance has ended. If not, the routine cycles and the site insurance is maintained. If, however, the outcome of the test at step 308 indicates that the given event that triggered the insurance has ended, the routine continues at step 310 to rewrite the local DNS record (e.g., by removing the CNAME). This returns the site back to its default operation, wherein the content is delivered without reference to the CDN. Steps 308 and 310 are not required, as the given site insurance may simply be removed after a given timeout, at a given time, or upon some other condition.

The content delivery network service provider may provide the site insurance functionality as a standalone product or managed service (as described above) or integrated with a global traffic management (GTM) product or service. An illustrative GTM system is known commercially as FirstPoint$^{SM}$ and is available from Akamai Technologies of Cambridge, Mass. This technique is described in commonly-owned U.S. Pat. No. 7,111,061, titled Global Load Balancing Across Mirrored Data Centers, which is incorporated herein by reference. Other commercial available products include Cisco Global Director, global load balancers from F5, and the like. Any product/system/managed service that has the ability to direct a client request to one of a set of mirrored sites based on network traffic conditions, server load, and the like, may be used as the GTM system.

In this embodiment, the content provider purchases the GTM and the site insurance services from the CDN service provider. The content provider's origin server may or may not be mirrored, but typically it will be. Accordingly, the GTM directs end user requests to the origin server, or to one of the mirrored origin servers, in the usual manner. Upon occurrence of a given event triggering the insurance policy, however, the GTM, as modified to include the site insurance mechanism, automatically and seamlessly moves traffic away from the origin servers and onto the CDN.

Integrating GTM and site insurance functionality in this manner provides significant advantages. In low demand situations, the GTM simply directs end users to the origin servers in the normal manner. As the demand increases, however, the GTM automatically senses the load changes and directs it to the CDN, where it can be more effectively managed by the distributed CDN infrastructure.

Figure 4:
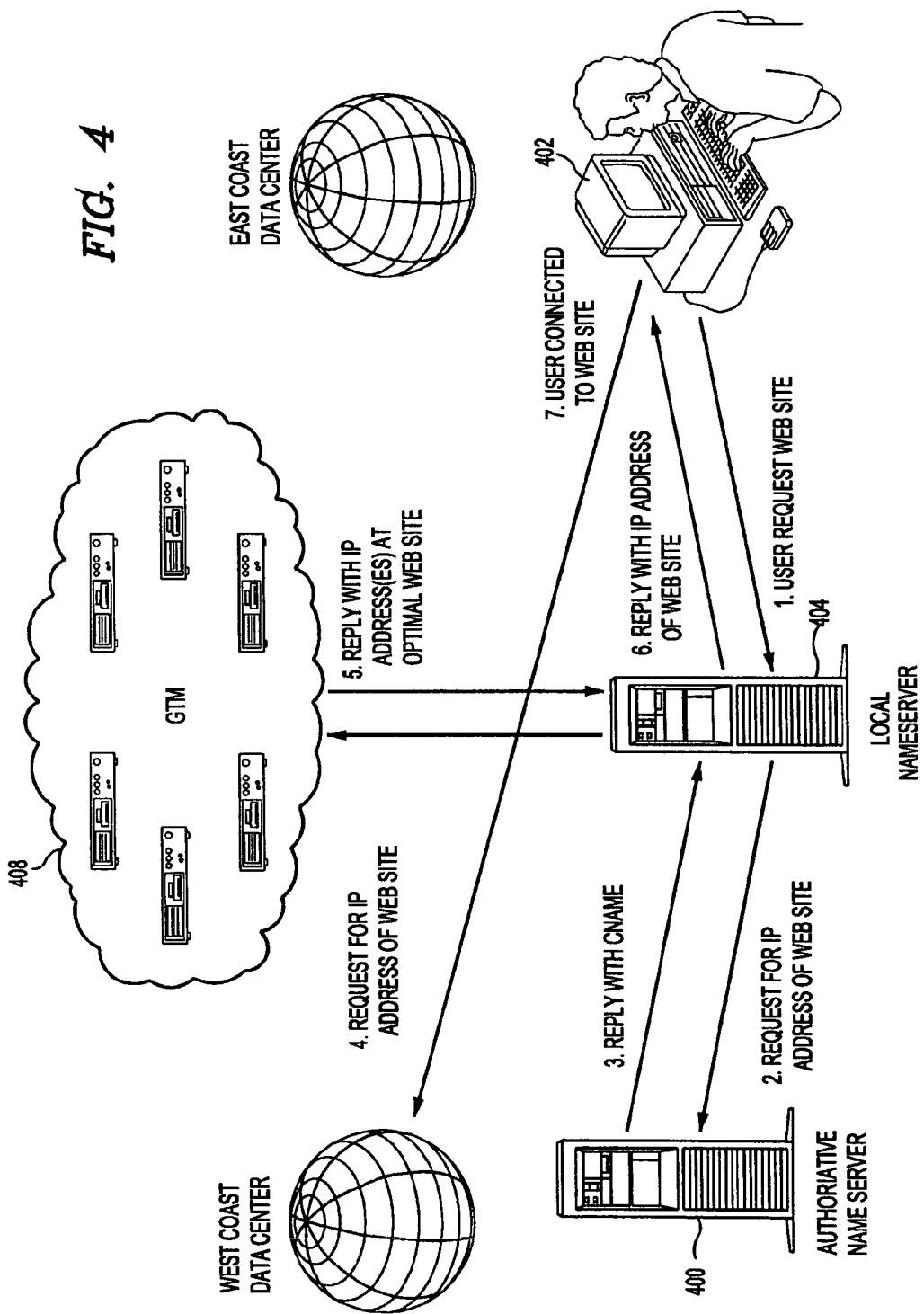
FIG. 4 illustrates a global traffic management system in which the site insurance functionality may be integrated according to an embodiment of the present invention.

FIG. 4 illustrates how a customer Web site is integrated into the traffic redirection system to take advantage of the site insurance. It is assumed that the customer has a distributed web site of at least two (2) or more mirrored origin servers. Typically, the GTM system operates to load balance multiple subdomains/properties provided they are in the same data centers. As described in U.S. Pat. No. 7,111,061, integration simply requires that the customer set its authoritative name server 400 to return a CNAME to the GTM name servers 408, which, thereafter, are used to resolve DNS queries to the mirrored customer site. Recursion is also disabled at the customer's authoritative name server. In operation of the GTM system, an end user 402 makes a request to the mirrored site using a conventional web browser or the like. The end user's local name server 404 issues a request to the authoritative name server 400 (or to a root server if needed, which returns data identifying the authoritative name server). The authoritative name server then returns the name of a name server 408 in the managed service. The local name server then queries the name server 408 for an IP address. In response, the name server 408 responds with a set containing one or more IP addresses that are "optimal" for that given local name server and, thus, for the requesting end user. As described in U.S. Pat. No. 7,111,061, the optimal set of IP addresses may be generated based on network maps created by testing the performance of representative common points on the network. The local name server selects an IP address from the "optimal" IP address list and returns this IP address to the requesting end user client browser. The browser then connects to that IP address to retrieve the desired content, e.g., the home page of the requested site. The above-described operation is augmented according to the present invention to include the site insurance functionality. The control mechanism 405 is illustrated in the drawing. Control mechanism 405 monitors for occurrence of the one or more triggering events to provide the site insurance functionality. This can be accomplished in a seamless manner by having authoritative name server 400, upon occurrence of the event, simply return the name of whatever lower level CDN name server will manage the request. The CDN service provider may operate separate name server mechanisms for the GTM service and for the site insurance, or these functions can be integrated into the same CDNSP-managed DNS. When the triggering event occurs, the end user browser's local name server 404 is handed back the name of a CDN name server from which the local name server 404 obtains the IP address of a CDN edge server. This redirection occurs automatically and without user involvement or knowledge.

Representative machines on which the present invention is operated may be Intel Pentium-based computers running a Linux or Linux-variant operating system and one or more applications to carry out the described functionality. One or more of the processes described above are implemented as computer programs, namely, as a set of computer instructions, for performing the functionality described. Having described our invention, what we claim is as follows.

The invention claimed is:

1. A method associated with an origin server that has a content provider domain mirrored at a set of mirror sites, comprising:

having a content delivery network (CDN) service provider provide a traffic management service to the origin server to determine which of the set of mirror sites should receive a request to the content provider domain that is replicated at the set of mirror sites, wherein the traffic management service is provided by aliasing the content provider domain to a traffic management domain managed by the CDN service provider;

as the traffic management service is being provided, monitoring the origin server for occurrence of a given condition, wherein the given condition is one of: a failure at the origin server, an occurrence of excess demand at a Web site hosted on the origin server, a receipt of a request for content that cannot then be served from the origin server, an occurrence of excess traffic to the Web site originating from a given geography or network, an occurrence of excess latency at the Web site as measured by network agents, and a denial of service attack;

upon occurrence of the given condition, dynamically rewriting a DNS record to point to a content delivery network (CDN) domain that is distinct from a content provider domain and the traffic management domain used by the CDN service provider to provide the traffic management service; and as the given condition persists, having a domain name server in the content delivery network (CDN) resolve the content delivery network domain to identify a content server for use in servicing the request.

2. The method as described in claim 1 wherein the origin server normally hosts given content associated with the content provider domain, wherein the given content is an object, or a markup language page having a set of one or more embedded objects.

3. The method as described in claim 1 wherein the DNS record is rewritten using a CNAME.

4. The method as described in claim 1 further including:

upon termination of the given condition, dynamically rewriting the DNS record to once again point to the traffic management domain used by the CDN service provider to provide the traffic management service.

* * * * *